(12) United States Patent
Hiraya et al.

(10) Patent No.: US 7,104,247 B2
(45) Date of Patent: *Sep. 12, 2006

(54) DIRECT FUEL INJECTION ENGINE

(75) Inventors: Koji Hiraya, Yokohama (JP); Tomonori Urushihara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/960,966

(22) Filed: Oct. 12, 2004

(65) Prior Publication Data

US 2005/0045145 A1     Mar. 3, 2005

Related U.S. Application Data

(62) Division of application No. 10/327,925, filed on Dec. 26, 2002, now Pat. No. 6,832,594.

(30) Foreign Application Priority Data

Jan. 9, 2002     (JP)     ............... 2002-002453

(51) Int. Cl.
*F02B 23/10*     (2006.01)
*F02F 3/26*     (2006.01)

(52) U.S. Cl. ............... 123/276; 123/298; 123/305

(58) Field of Classification Search ............... 123/269, 123/276, 279, 285, 301, 307, 298, 305
See application file for complete search history.

(56) References Cited

U.S. PATENT DOCUMENTS

| | | | |
|---|---|---|---|
| 3,872,841 A | 3/1975 | Kimbara et al. | |
| 4,221,190 A | 9/1980 | Komiyama et al. | |
| 4,919,093 A * | 4/1990 | Hiraki et al. | ............... 123/299 |
| 5,097,807 A | 3/1992 | Oikawa et al. | |
| 5,099,809 A | 3/1992 | Kawatani et al. | |
| 5,170,758 A | 12/1992 | Chmela | |
| 5,775,289 A | 7/1998 | Yoshida et al. | |
| 5,906,183 A * | 5/1999 | Echtle et al. | ............... 123/301 |
| 6,158,409 A * | 12/2000 | Gillespie et al. | ......... 123/193.6 |
| 6,161,518 A * | 12/2000 | Nakakita et al. | ............ 123/298 |
| 6,269,789 B1 * | 8/2001 | Abe et al. | ................... 123/294 |
| 6,460,509 B1 | 10/2002 | Muramatsu et al. | |
| 6,513,487 B1 * | 2/2003 | Jorach et al. | ............... 123/299 |
| 6,543,408 B1 * | 4/2003 | Ernst et al. | ................. 123/295 |
| 6,553,960 B1 * | 4/2003 | Yoshikawa et al. | ......... 123/299 |
| 6,575,132 B1 * | 6/2003 | Ernst et al. | ................. 123/295 |

(Continued)

FOREIGN PATENT DOCUMENTS

JP     49-41709     4/1974

(Continued)

*Primary Examiner*—Hai Huynh
(74) *Attorney, Agent, or Firm*—Global IP Counselors

(57) ABSTRACT

A direct fuel injection engine has a fuel injection valve that injects fuel toward a cavity formed in a top of a piston, and a spark plug that ignites the fuel-air mixture resulting from the fuel injection. The direct fuel injection engine is configured to strengthen the penetration of the fuel streams, to improve the directionality of the fuel streams and to form in the cavity an agglomerate fuel-air mixture that is homogeneous and has uniform concentration. The cavity preferably has a bottom surface, a curved surface, and a flat surface. The fuel injection valve has a plurality of injection vents that spray solid-core fuel streams with angles formed between adjacent injection vents that are less than or equal to the spray angle of the fuel stream sprayed from each injection vent. The fuel streams form a combined fuel stream having a hollow circular cone shape.

9 Claims, 13 Drawing Sheets

U.S. PATENT DOCUMENTS

| | | |
|---|---|---|
| 6,644,268 B1 * 11/2003 | Konig et al. | 123/299 |
| 6,651,615 B1 * 11/2003 | Suzuki et al. | 123/305 |
| 6,672,276 B1 * 1/2004 | Hiraya et al. | 123/276 |
| 6,739,309 B1 * 5/2004 | Hiraya et al. | 123/279 |
| 6,799,550 B1 * 10/2004 | Wirth | 123/276 |
| 6,814,046 B1 * 11/2004 | Hiraya et al. | 123/294 |
| 6,851,408 B1 * 2/2005 | Hotta et al. | 123/305 |
| 6,912,989 B1 * 7/2005 | Tayama et al. | 123/276 |
| 2002/0179039 A1 * 12/2002 | Wuerfel | 123/298 |

FOREIGN PATENT DOCUMENTS

| | | |
|---|---|---|
| JP | 49-41710 | 4/1974 |
| JP | 49-41711 | 4/1974 |
| JP | 54-134809 | 9/1979 |
| JP | 54-134810 | 9/1979 |
| JP | 54-134811 | 9/1979 |
| JP | 64-45918 | 2/1989 |
| JP | 3-32124 | 3/1991 |
| JP | 5-79331 | 3/1993 |
| JP | 8/312351 | 11/1996 |
| JP | 8-312353 | 11/1996 |
| JP | 8-319835 | 12/1996 |
| JP | 9-158736 | 6/1997 |
| JP | 11-82028 | 3/1999 |
| JP | 2000-227028 | 8/2000 |

* cited by examiner

DIRECT FUEL INJECTION ENGINE

CROSS-REFERENCE TO RELATED APPLICATIONS

This application is a divisional application of U.S. patent application Ser. No. 10/327,925 filed on Dec. 26, 2002 now U.S. Pat. No. 6,832,594, which claims priority to Japanese Patent Application No. JP2002-2453 filed on Jan. 9, 2002. The entire disclosures of U.S. patent application Ser. No. 10/327,925 and Japanese Patent Application No. JP2002-2453 are hereby incorporated herein by reference.

BACKGROUND OF THE INVENTION

1. Field of the Invention

The present invention generally relates to a fuel injected internal combustion engine. More specifically, the present invention relates to a fuel injected internal combustion engine with direct fuel injection into the combustion chamber and spark-ignition.

2. Background Information

An example of a fuel injected internal combustion engine with direct fuel injection into the combustion chamber and spark-ignition is disclosed in Japanese Laid-Open Patent Publication No. 11-82028. In this publication, a fuel injection valve is arranged in an upper part of a combustion chamber and a cavity is formed in the top of the piston. The fuel injection valve injects a fuel stream generally shaped as a hollow circular cone toward the cavity of the piston and a spark plug ignites the fuel-air mixture formed by the injected fuel.

The cavity has a generally cylindrical surrounding wall surface, a bottom surface that connects smoothly with the surrounding wall surface, and a central protrusion that is shaped generally like a circular cone and connects smoothly with the bottom surface. The bulk of the generally hollow circular cone shaped fuel stream injected toward the cavity strikes the surrounding wall, proceeds along the bottom surface, and rises upward while following the contour of the protrusion and converging toward the center. As a result, the fuel-air mixture is formed that is concentrated in the area surrounding the spark plug, which is positioned directly above the protrusion. This arrangement allows excellent laminar combustion to be achieved.

The so-called swirl injection valve is sometimes used to inject fuel in such a manner that the fuel stream has the shape of a circular cylinder. The swirl injection valve injects the fuel while imparting a rotating component to the fuel flow inside the injection vent. The rotating component rotates about the axis of the injection vent.

In view of the above, it will be apparent to those skilled in the art from this disclosure that there exists a need for an improved direct fuel injection engine. This invention addresses this need in the art as well as other needs, which will become apparent to those skilled in the art from this disclosure.

SUMMARY OF THE INVENTION

It has been discovered that with a swirl injection valve as mentioned above, the penetration of the fuel stream is generally weak in the fuel injection direction. Consequently, in order to allow the majority of the injected fuel to hit the surrounding wall surface of the cavity it is necessary to keep the gas flow inside the cylinder extremely small. This requirement greatly restricts the degree of design freedom when designing the engine.

Furthermore, it has been discovered that the shape of the fuel stream sprayed from a swirl injection valve changes greatly depending on the cylinder pressure at the time of injection. Consequently, if the fuel is injected during the compression stroke, the pressure inside the cylinder changes greatly depending on the position of the piston. Thus, depending on the injection timing, it may not be possible to maintain the desired hollow circular cone shape.

One object of the present invention is to solve the problems resulting from the use of a so-called swirl injection valve.

The present invention is basically attained by providing a direct fuel injection engine comprising a combustion chamber, a spark plug and a fuel injection valve. The combustion chamber has a piston movably mounted therein. The piston includes an upper wall having a cavity with a fuel stream directing surface. The spark plug has a spark discharge gap arranged to ignite a fuel-air mixture in the combustion chamber. The fuel injection valve includes a front edge portion with a plurality of injection vents arranged and configured to directly inject fuel into the combustion chamber against the fuel stream directing surface as a plurality of solid-core fuel streams that strike at non-perpendicular angles. Each of the injection vents includes a center spraying axis and a predetermined spraying angle. The adjacent pairs of the injection vents are further arranged such that the center spraying axes form predetermined separation angles between adjacent pairs of the solid-core fuel streams that are equal to or smaller than the spraying angles of the injection vents.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
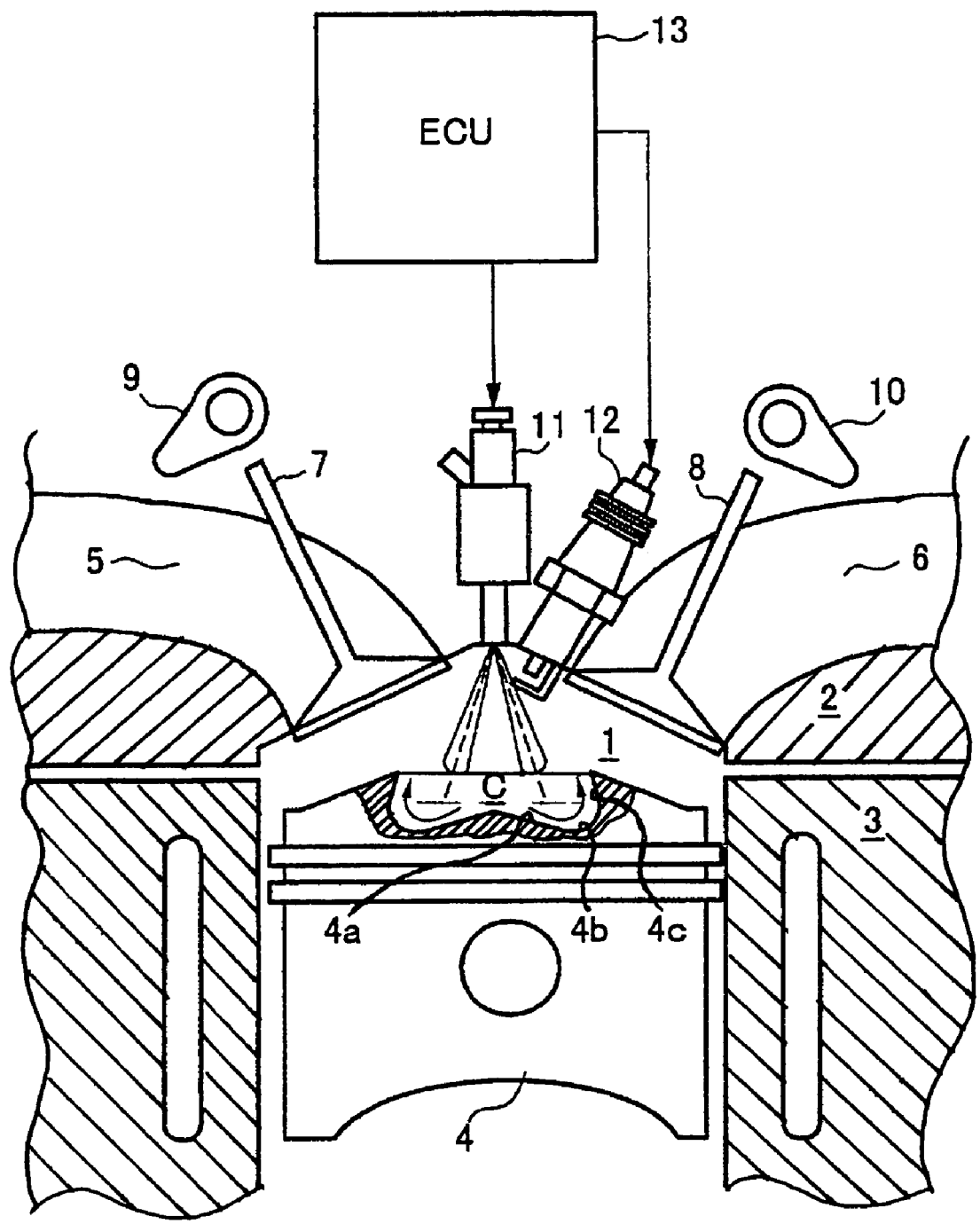
FIG. 1 is a diagrammatic partial cross-sectional view of a fuel injection portion for a direct fuel injection engine in accordance with a first embodiment of the present invention.

Referring initially to FIG. 1, a fuel injection portion of a direct fuel injection engine is schematically illustrated in accordance with a first embodiment of the present invention. Basically, the fuel injection portion of the direct fuel injection engine of the first embodiment of the present invention includes the combustion chamber 1, a cylinder head 2, a cylinder block 3 and a piston 4. The cylinder head 2 is provided with an intake port 5 and an exhaust port 6, both of which open into the combustion chamber 1. An intake valve 7 and an exhaust valve 8 are mounted in the cylinder head 2 and an intake cam 9 and an exhaust cam 10 are provided to control the opening and closing of the valves 7 and 8 in a conventional manner.

The fuel injection portion of the direct fuel injection engine of the first embodiment of the present invention further includes a fuel injection valve 11 and a spark plug 12 are arranged in the center portion of the cylinder head 2 such that they face the inside of the combustion chamber 1. The fuel injection valve 11 is positioned on the center axis of the combustion chamber 1 and the spark plug 12 is arranged in close proximity to the fuel injection valve 11. The present invention makes it possible to obtain fuel streams having optimum shapes when the fuel injection valve 11 is installed at the center of the engine cylinder as seen in FIG. 1. Also, by installing the fuel injection valve 11 at the center of the engine cylinder, the shape of the piston cavity and the shape of the entire combustion chamber 1 can be made substantially symmetrical about the center axis of the fuel injection valve 11 and the flame propagation at the point in time when the S/V ratio is minimum and the combustion is homogeneous can be made symmetrical. Consequently, an engine can be obtained which has no spikes in its anti-knocking performance, i.e., no spikes in its output and fuel consumption.

The fuel injection valve 11 and the spark plug 12 are conventional components that are well known in the art. Since fuel injection valves and spark plugs are well known in the art, these structures will not be discussed or illustrated in detail herein. An engine control unit 13 controls the operations of the fuel injection valve 11 and the spark plug 12 in a conventional manner.

The engine control unit 13 preferably includes a microcomputer with a direct fuel injection control program that controls fuel injection portion of the direct fuel injection engine in a conventional manner. The engine control unit 13 can also include other conventional components such as an input interface circuit, an output interface circuit, and storage devices such as a ROM (Read Only Memory) device and a RAM (Random Access Memory) device. The engine control unit 13 is a conventional component that is well known in the art. Since engine control units are well known in the art, the particulars of the engine control unit 13 will not be discussed or illustrated in detail herein.

The fuel injection valve 11 injects the fuel at a fuel injection pressure of at least 20 MPa. Thus, fuel streams with small particle sizes, i.e., fuel streams that do not generate smoke, can be formed even when using a hole nozzle for the fuel injection valve 11, which sometimes causes the particle size of the injected fuel to become large if the fuel injection pressure is low.

A recessed cavity C is formed in the top face or upper wall of the piston 4. The cavity C has a circular opening with a fuel stream directing surface having a first or bottom wall surface 4a, a second or curved wall surface 4b and a third or flat wall surface 4c. The fuel from the fuel injection valve 11 is directly injected into the combustion chamber 1 against the fuel stream directing surface as a plurality of solid-core fuel streams that strike at non-perpendicular angles. In particular, the fuel injection valve 11 has a front edge portion with a plurality of injection vents 11a arranged and configured to directly inject fuel into the combustion chamber 1 against the fuel stream directing surface. Each of the injection vents 11a includes a center spraying axis and a predetermined spraying angle. The solid-core fuel streams as used herein refers to an elongated bar shaped stream of atomized fuel that does not include a center hollow core that is substantially free of atomized fuel.

It will be apparent to those skilled in the art from this disclosure that the precise shape of the fuel stream directing surface of the cavity C depends upon the various dimensional relationships and constructions of the parts (e.g., the combustion chamber 1, the piston 4, the fuel injection valve 11 and the spark plug 12) of the fuel injection engine. Thus, the shape of the fuel stream directing surface of the cavity C is provided for illustration only and not for the purpose of limiting the invention as defined by the appended claims.

The bottom wall surface 4a is preferably a cone shaped surface with its apex positioned at the center of the piston 4 that is also centered on the vertical center axis of the fuel injection valve 11. The bottom wall surface 4a slants slightly downward as it moves outwardly away from the center of the piston 4. The curved wall surface 4b is annular curved surface that joins the outer edge of the bottom wall surface 4a to the inner edge of the wall surface 4c. The curved wall surface 4b has a predetermined radius of curvature that directs the fuel streams hitting the upper wall of the piston 4 upwardly towards the vicinity of the tip of the fuel injection valve 11. The flat wall surface 4c is an annular conical surface that extends directly from the outer annular edge of the curved wall surface 4b. The flat wall surface 4c points generally toward the vicinity of the tip of the fuel injection valve 11.

In the case of the cavity C having circular shape that is centered on the fuel injection valve 11, the transverse cross-section is preferably constant as in the illustrated embodiment. Of course, it will be apparent to those skilled in the art from this disclosure that the transverse cross-section of the cavity C can vary at different areas depending upon the various dimensional relationships of the parts (e.g., the combustion chamber 1, the piston 4, the fuel injection valve 11 and the spark plug 12) of the fuel injection engine.

Figure 2:
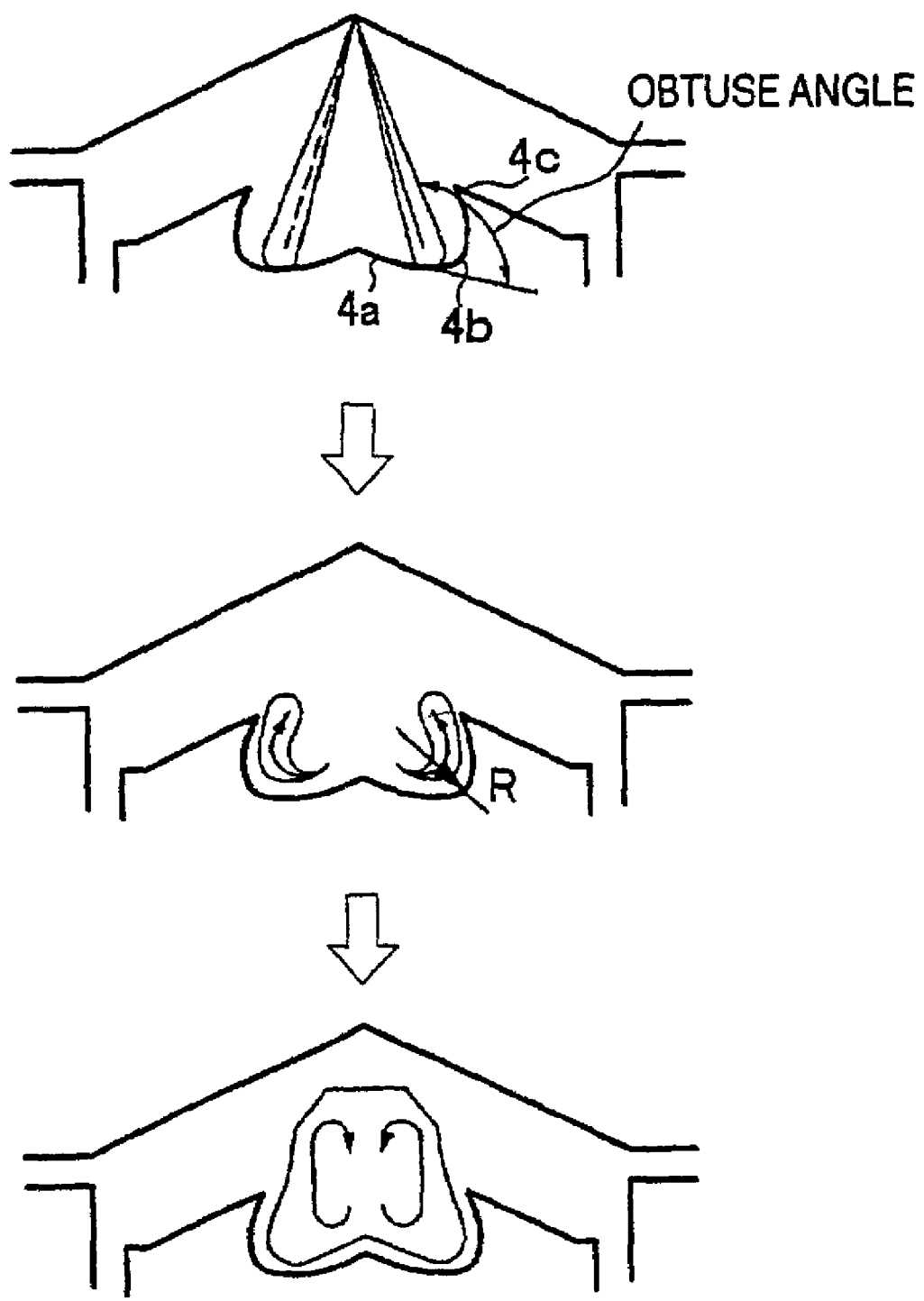
FIG. 2 is a sequential schematic illustration of fuel being injected into the cavity of the top surface of the piston to show the behavior of the injected fuel stream in the direct fuel injection engine illustrated in FIG. 1 in accordance with the first embodiment of the present invention.

Referring now to FIG. 2, the general relationship between the shape of the cavity C and the behavior of the fuel streams that are injected from the fuel injection valve 11 into the combustion chamber 1 is illustrated at a first fuel injection timing. At this first fuel injection timing, fuel streams first strike or hit the bottom wall surface 4a of the cavity C. The angle of the bottom wall surface 4a is configured such that the angle formed between a line corresponding to the direction in which the fuel streams were injected and the portion of the cavity wall where the fuel stream proceeds after hitting the bottom wall surface 4a is an obtuse angle. After hitting the bottom wall surface 4a, the fuel streams are guided by the curved wall surface 4b (second wall surface) and the flat wall surface 4c (third wall surface) toward the vicinity of the tip of the fuel injection valve 11. The curved wall surface 4b and the flat wall surface 4c cause the velocity of the fuel streams in the injection direction to be converted to the direction from which the fuel was injected and, as a result, a rotating swirl-like flow velocity is imparted to the fuel streams. The rotating flow velocity pulls in air from the surrounding areas and the fuel-air mixture formed above the cavity C is homogeneous and free of concentration variations. Although not shown in the drawings, the effects of the present invention can also be obtained by eliminating the flat wall surface 4c and configuring the curved wall surface 4b such that its free end face points toward the tip of the fuel injection valve 11. In the present invention, the end portion of the curved wall surface 4b points toward the vicinity of the tip of the fuel injection valve 11. As a result, it is easier for the velocity of the fuel streams in the injection direction to be converted into rotating flow velocity and a more homogeneous and highly laminar fuel-air mixture can be formed.

Figure 3:
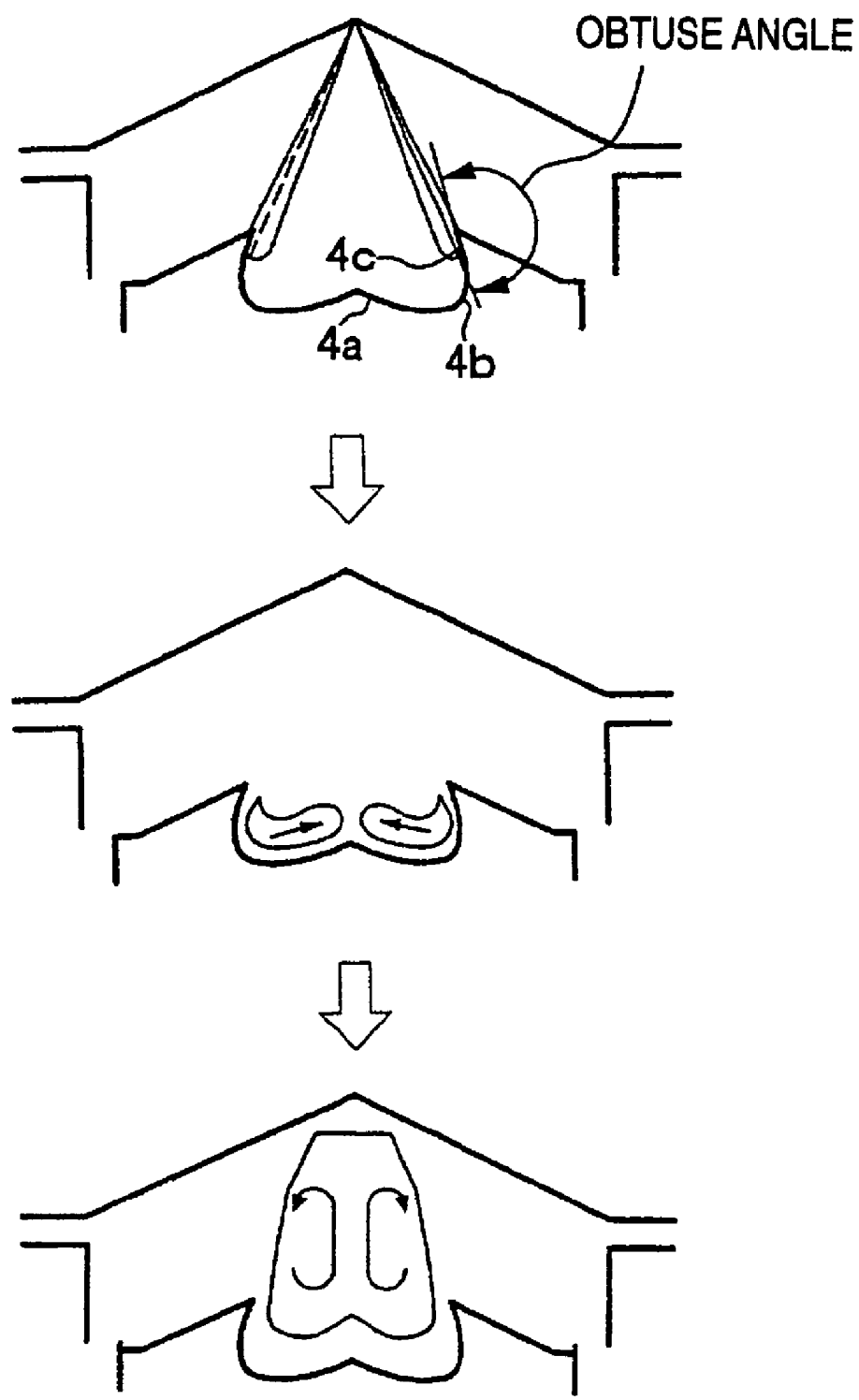
FIG. 3 is a sequential schematic illustration, similar to FIG. 2, of fuel being injected into the cavity of the top surface of the piston to show the behavior of the injected fuel stream in the direct fuel injection engine at a different fuel injection timing than that illustrated in FIG. 2.

Referring now to FIG. 3, the relationship between the shape of the cavity C and the behavior of the fuel streams that are injected from the fuel injection valve 11 into the combustion chamber 1 is illustrated at a second fuel injection timing in which the fuel streams strike the flat wall surface 4c of the cavity C.

When the fuel injection timing is relatively early as seen in FIG. 3, the fuel streams initially strike the cavity C at the flat wall surface 4c (here, this wall surface becomes the first wall surface) at an obtuse angle. Then the fuel streams are guided by the curved wall surface 4b (second wall surface) and the bottom wall surface 4a (there is no third wall surface in this case). The bottom wall surface 4a rises toward the center because it is configured such that the fuel streams will hit it at an obtuse angle in the case shown in FIG. 2. Consequently, after being guided from the flat wall surface 4c by the curved wall surface 4b, the fuel streams are directed above the cavity C and forms a circulating region. In other words, this circulating region is formed within the cavity C because the fuel stream are guided by the curved surface of the curved wall surface 4b such that the velocity of the fuel streams in the injection direction is converted into rotating flow velocity. As a result, a homogeneous fuel-air mixture field can be formed within the cavity because the fuel and air can mix together easily and it is difficult for variations in concentration to occur. Stated differently, the fuel-air mixture formed above the cavity C is homogeneous and free of concentration variations. Thus, by using a cavity shaped like that of the present embodiment, a homogeneous fuel-air mixture can be formed regardless of the ignition timing and stable laminar combustion can be achieved regardless of the engine speed and load.

Figure 4:
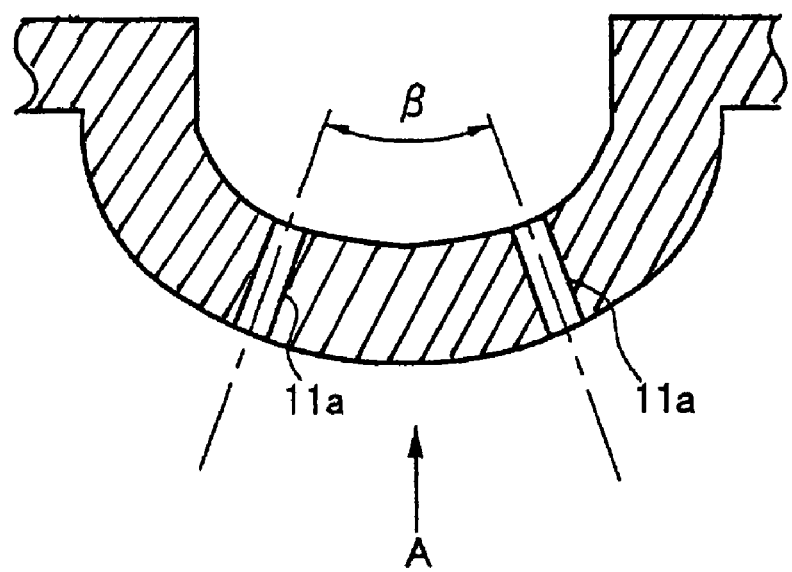
FIG. 4 is a diagrammatic vertical cross sectional view of the tip section of the fuel injection valve of the direct fuel injection engine illustrated in FIG. 1 as viewed along section line 4—4 of FIG. 5.
Figure 5:
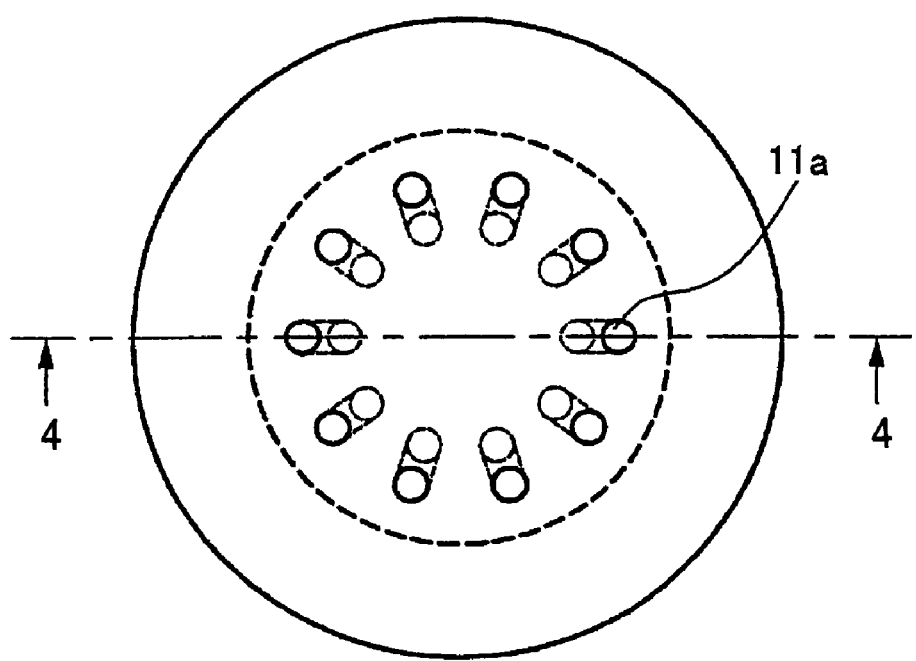
FIG. 5 is a diagrammatic bottom plan view of the tip section of the fuel injection valve of the direct fuel injection engine illustrated in FIG. 1 as viewed along the direction of arrow A of FIG. 4.
Figure 6:
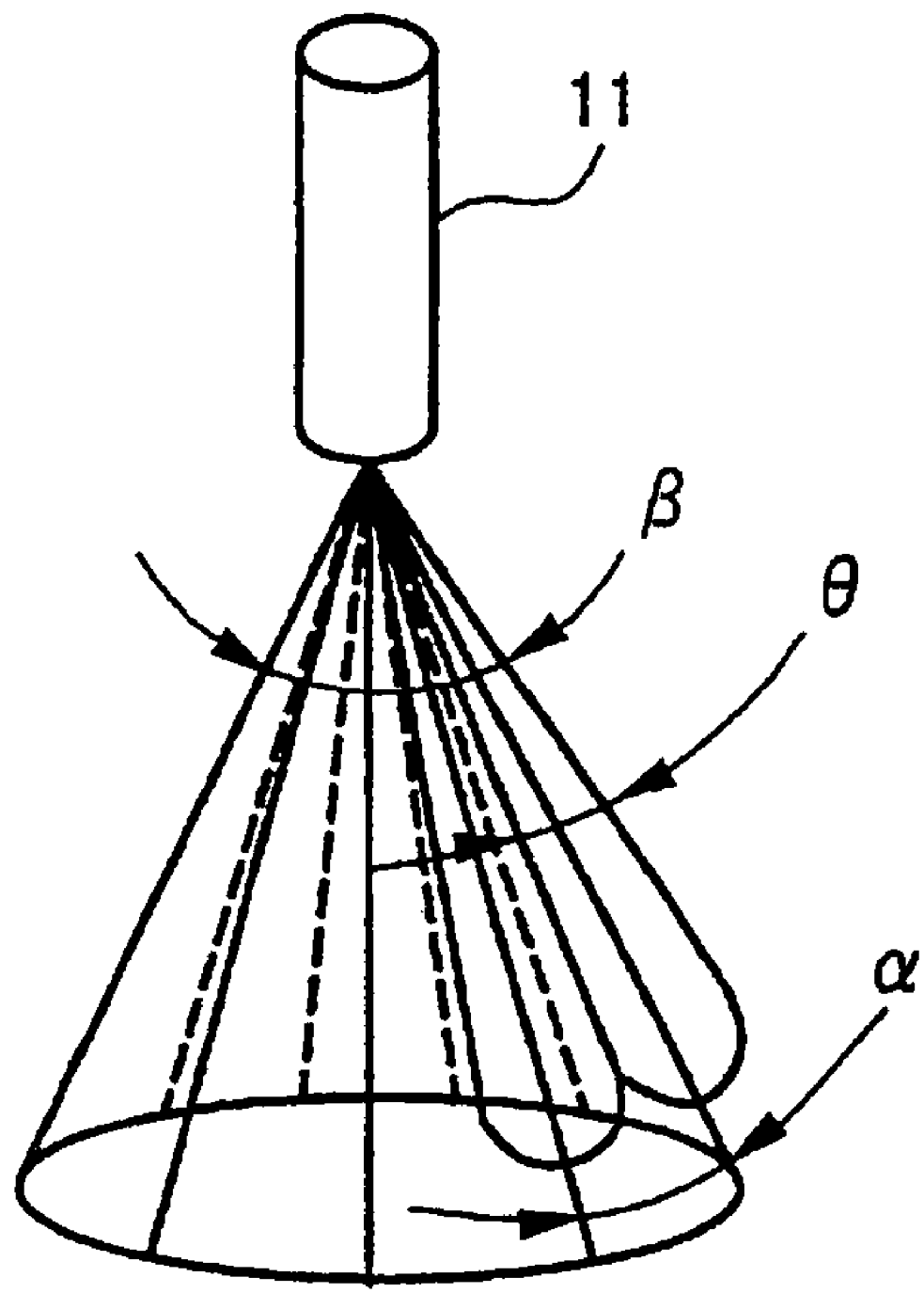
FIG. 6 is a diagrammatic illustration of the shape of the fuel streams from the fuel injection valve of the direct fuel injection engine illustrated in FIG. 1 in accordance with the first embodiment of the present invention.

Referring now to FIGS. 4 and 5, the tip of the fuel injection valve 11 will now be explained. FIG. 4 is a vertical cross sectional view (taken along line 4—4 of FIG. 5) of the tip of the fuel injection valve 11, while FIG. 5 is a bottom plan view as viewed along the direction of arrow A of FIG. 4. The fuel injection valve 11 is a hole nozzle that has a plurality of the injection vents 11a arranged around the center axis of the fuel injection valve 11 with equal angular spacing therebetween. Each of the injection vent 11a has a circular cross section with a prescribed diameter and the center axis of each injection vent 11a points diagonally outward such that all of the injection vents 11a have their center axes forming the vertex angle β of a circular cone, as shown in FIG. 4. The shape of the fuel streams are shown in FIG. 6. The injection vents 11a of the fuel injection valve 11 each form a fuel stream having a solid circular cone shape that is close to being rod-shaped. Thus, the injection vents 11a are arranged and configured to directly inject fuel into the combustion chamber 1 against the fuel stream directing surface as plurality of elongated solid-core fuel streams that strike at non-perpendicular angles. Together the plurality of streams injected from injection vents 11a form a combined fuel stream having the shape of a hollow circular cone.

The separation angle a formed between adjacent center axes of the injection vents 11a is less than or equal to the spread or spraying angle θ of the fuel streams sprayed from a single one of the injection vent 11a. In other words, the adjacent pairs of the injection vents 11a are arranged such that the center spraying axes form predetermined separation angles α between adjacent pairs of the solid-core fuel streams that are equal to or smaller than the spraying angles θ of the injection vents 11a. For example, according to Hiroyasu et al. (Journal of the Japan Society of Mechanical Engineers (Section 2), 621.436.013.4), the spread or spray angle θ of the fuel streams sprayed from a hole nozzle injection valve is approximately 20 degrees. Therefore, if the number of injection vents is 10 and the vertex angle (angle β in FIG. 4) of the combined fuel streams is set to approximately 60 degrees, then the angle between adjacent individual fuel streams will be approximately 18 degrees and adjacent individual fuel streams will overlap.

By configuring the fuel injection valve 11 such that each individual fuel stream is a solid-core fuel stream as described here, strong penetration can be obtained, the directionality can be increased, and the effects of gas flows inside the cylinder can be reduced. Consequently, the shape of the fuel streams do not change due to back pressure and the relationship between the cavity C and the fuel streams can be stabilized. Thus, a fuel stream having strong directionality and a stable shape can be formed even under the high back pressure conditions that exist during the latter half of the compression stroke.

Additionally, since the separation angle β between adjacent injection vents 11a is set such that adjacent fuel streams touch or partially overlap each other, the plurality of individual fuel streams form a combined fuel stream having a prescribed shape and the combined fuel stream is free of gaps and has little variation in fuel distribution on the inside thereof. Therefore, it is possible to form a single agglomerate fuel-air mixture field that is stable and homogeneous and has a more uniform concentration. By forming a homogeneous fuel-air mixture agglomeration in the cavity C, it is possible to achieve laminar combustion that releases few NOx emissions because no smoke is produced. Also the combustion is more stable even if exhaust gas is recirculated (EGR) in large quantities.

Figure 7A:
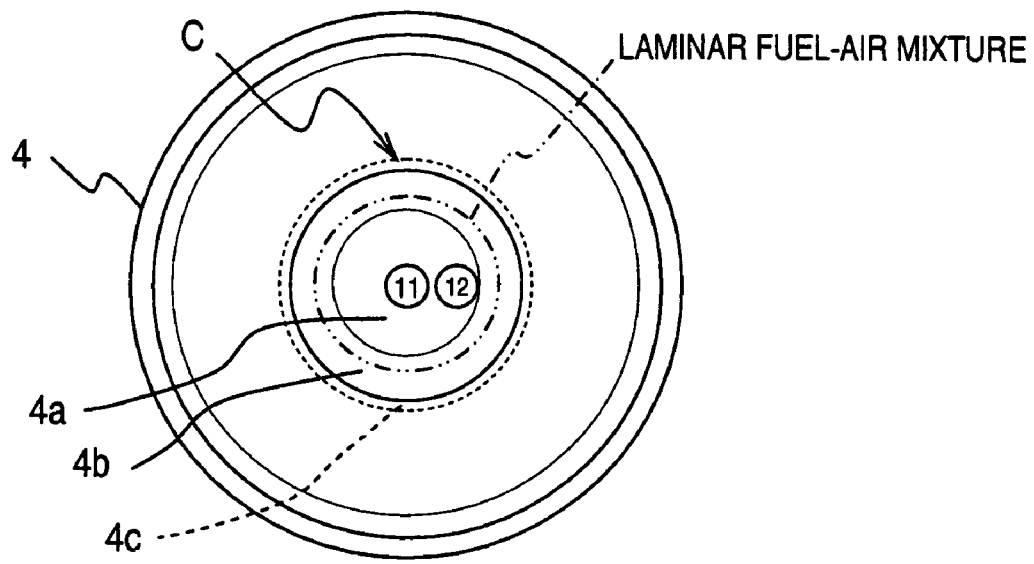
FIG. 7A is a top diagrammatic plan view of the shape of the circularly cavity formed in the top surface of the piston of the direct fuel injection engine illustrated in FIG. 1 of the first embodiment, when viewed from above the piston.
Figure 7B:
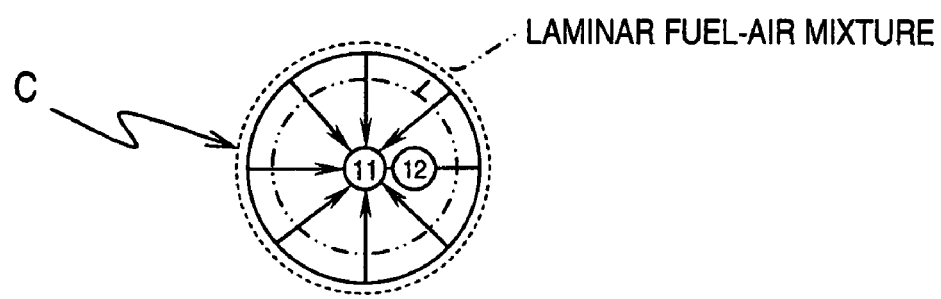
FIG. 7B is a schematic illustration showing the fuel streams from the fuel injection valve relative to the spark plug and the fuel injection valve for the circularly shaped cavity formed in the top surface of the piston of the direct fuel injection engine illustrated in FIG. 1 of the first embodiment, when viewed from above the piston.

FIGS. 7A and 7B show the shape of the piston cavity C when viewed from above the combustion chamber 1. The cavity C has the shape of a circle whose center corresponds to the position of the fuel injection valve 11. As shown in FIG. 2, the shape of the cavity C causes the injected fuel stream to form a circulating region and to form a uniform laminar fuel-air mixture centered on the fuel injection valve 11. The effects of the present invention can be sufficiently obtained when both the fuel injection valve 11 and the spark plug 12 are positioned substantially at the center of the combustion chamber 1.

Figure 8A:
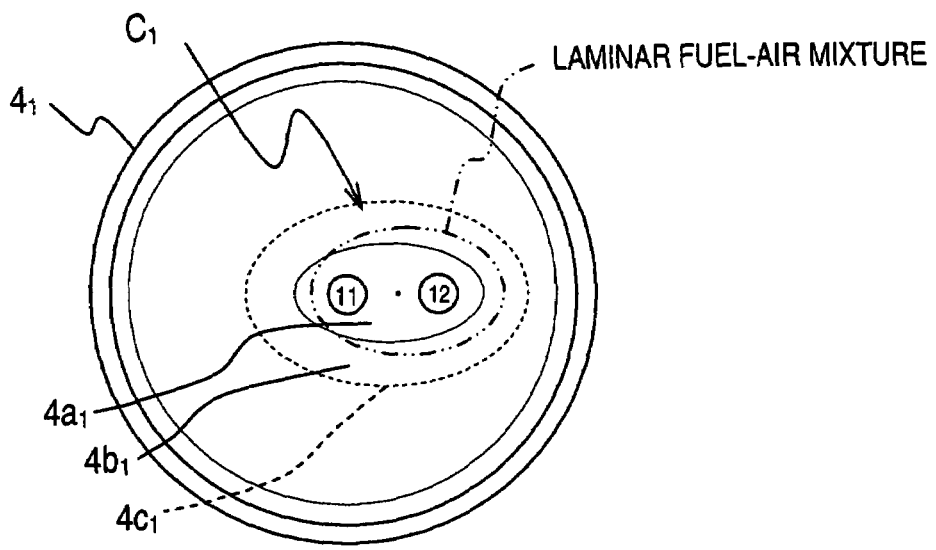
FIG. 8A is a top diagrammatic plan view of an alternate shape (elliptical) for the cavity formed in the top surface of the piston of the direct fuel injection engine illustrated in FIG. 1 of the first embodiment, when viewed from above the piston.
Figure 8B:
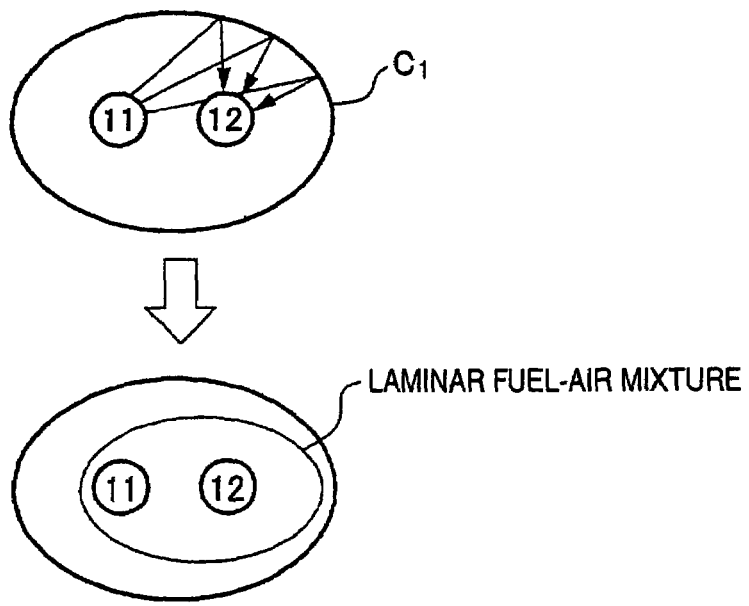
FIG. 8B is a sequential schematic illustration showing the fuel streams from the fuel injection valve relative to the spark plug and the fuel injection valve for the elliptically shaped cavity of FIG. 8A that can be formed in the top surface of the piston of the direct fuel injection engine illustrated in FIG. 1 of the first embodiment, when viewed from above the piston.

Referring now to FIGS. 8A and 8B, when restrictions on the engine layout prohibit positioning the fuel injection valve 11 and the spark plug 12 very close to each other, it is preferred to use an elliptically shaped piston cavity $C_1$, when viewed from above, such as diagrammatically illustrated in FIGS. 8A and 8B. In this embodiment, the elliptically shaped cavity $C_1$ has the overall shape of an ellipse whose foci are located at the fuel injection valve 11 (i.e., the tip thereof) and at the spark plug 12 (i.e., the spark discharge gap thereof). In other words, the elliptically shaped piston cavity $C_1$ can be used in place of the circularly shaped cavity C, when restrictions on the engine layout prohibit positioning the fuel injection valve 11 and the spark plug 12 very close to each other. By using a wall surface having the shape of an ellipse whose foci are located at the tip of the fuel injection valve 11 and at the spark discharge gap of the spark plug 12, the present invention makes it possible for the injected fuel to form a laminar fuel-air mixture centering on the spark plug 12, and thus, achieves a stable, laminar spark ignited combustion.

The elliptically shaped cavity $C_1$ is offset from the center of the piston. The elliptically shaped cavity $C_1$ has an elliptical opening with a fuel stream directing surface having a first or bottom wall surface $4a_1$, a second or curved wall surface $4b_1$ and a third or flat wall surface $4c_1$. The fuel from the fuel injection valve 11 is directly injected into the combustion chamber against the fuel stream directing surface of the elliptically shaped cavity $C_1$ as a plurality of solid-core fuel streams that strike at non-perpendicular angles.

It will be apparent to those skilled in the art from this disclosure that the precise shape of the fuel stream directing surface of the elliptically shaped cavity $C_1$ depends upon the various dimensional relationships and constructions of the parts of the fuel injection engine. Thus, the shape of the fuel stream directing surface of the elliptically shaped cavity $C_1$ is provided for illustration only and not for the purpose of limiting the invention as defined by the appended claims.

The bottom wall surface $4a_1$ is preferably an elliptically shaped conical surface with its apex positioned at a center point of the ellipse, e.g., midway between the fuel injection valve 11 and the spark plug 12. The bottom wall surface $4a_1$ slants slightly downward as it moves outwardly away from the center of the ellipse. The curved wall surface $4b_1$ is annular curved surface that joins the outer edge of the bottom wall surface 4a to the inner edge of the wall surface $4c_1$. The curved wall surface $4b_1$ has a predetermined radius of curvature that directs the fuel streams hitting the upper wall of the piston $4_1$ upwardly towards the vicinity of the tip of the spark plug 12. The flat wall surface $4c_1$ is an annular conical surface that extends directly from the outer annular edge of the curved wall surface $4b_1$. The flat wall surface $4c_1$ points generally toward the vicinity of the tip of the spark plug 12. In the case of the elliptically shaped cavity $C_1$ that is offset from the fuel injection valve 11, the transverse cross-section is preferably non-uniform so that the fuel streams hitting the upper wall of the piston $4_1$ is directed upwardly towards the vicinity of the tip of the spark plug 12.

Basically, the elliptically shaped piston cavity $C_1$ functions in the same manner as the circularly shaped cavity C. Thus, the general descriptions of the function of the circularly shaped cavity C also apply to the elliptically shaped piston cavity $C_1$. Thus, the shape of the cavity $C_1$ causes the fuel streams injected from the fuel injection valve 11 to form a fuel circulating region, as shown in FIG. 2. The fuel circulating region formed by the fuel streams injected from the fuel injection valve 11 against the elliptically shaped piston cavity $C_1$ results in a uniform laminar fuel-air mixture in the same manner as the circularly shaped cavity C. Since the spark plug 12 is located at a focus of the ellipse, the injected fuel streams gather in the vicinity of the spark plug 12 due to the shape of the cavity C and the laminar fuel-air mixture is centered on the spark plug 12.

SECOND EMBODIMENT

Referring now to FIGS. 9–16, a schematic view of a direct fuel injection engine invention will be described in accordance with a second embodiment of the present invention. In view of the similarity between the first and second embodiments, the parts of the second embodiment that are identical to the parts of the first embodiment will be given the same reference numerals as the parts of the first embodiment. On the other hand, the parts of the second embodiment that differ from the parts of the first embodiment will be indicated with a prime ('). Thus, the descriptions of the parts of the second embodiment that are identical to the parts of the first embodiment may be omitted for the sake of brevity.

Figure 9:
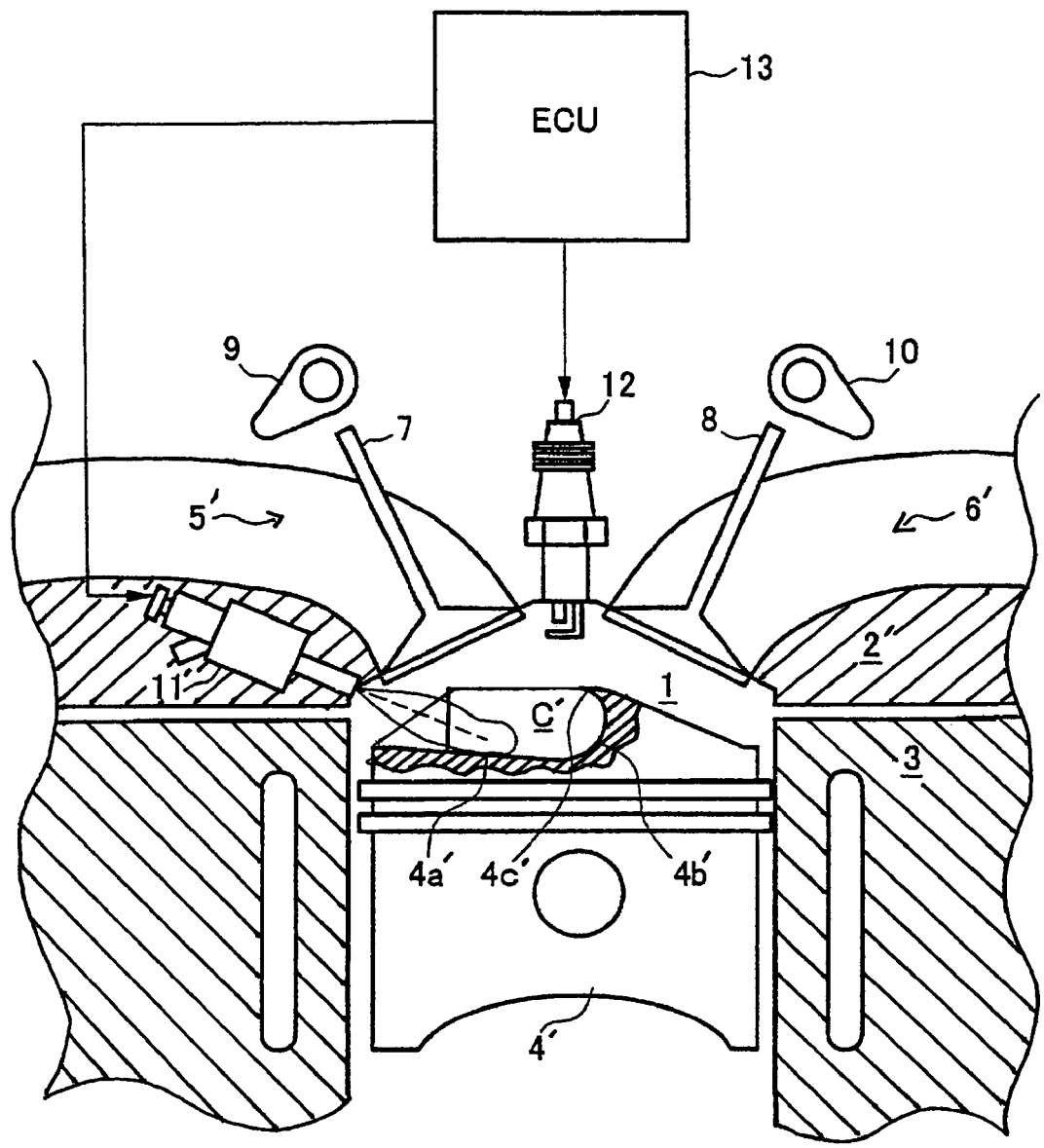
FIG. 9 is a schematic view of a fuel injection portion of a direct fuel injection engine in accordance with a second embodiment of the present invention.

Basically, the fuel injection portion of the direct fuel injection engine of the second embodiment of the present invention differs from the first embodiment in that a modified cylinder head 2' and a modified piston 4' are used. In particular, the cylinder head 2' has been modified such that a modified fuel injection valve 11' is positioned to one side the combustion chamber 1 and the spark plug 12 is positioned along the center axis of the combustion chamber 1. The present invention makes it possible to obtain a fuel streams having optimum shape when the fuel injection valve 11' is installed at the rim of the engine cylinder as seen in FIG. 9.

Thus, the direct fuel injection engine of the second embodiment basically includes the combustion chamber 1, the cylinder head 2', the cylinder block 3 and the piston 4'. The cylinder head 2' is provided with an intake port 5' and an exhaust port 6', both of which open into the combustion chamber 1.

In this embodiment, the present invention is applied to an engine in which the fuel injection valve 11' is positioned to the side of the combustion chamber 1 and below the intake port 5'. In particular, the portion of the top or upper wall of the piston 4' on the intake side of the engine is provided with a cavity C'. The cavity C' has a bottom wall surface 4a' (first wall surface), a curved wall surface 4b' (second wall surface) and a flat surface 4c' (third wall surface). The bottom wall surface 4a' is offset from the center of the piston 4' and slants slightly downward as it moves inwardly towards the center of the piston 4'.

The curved wall surface 4b' joins the inner edge of the bottom wall surface 4a' to the inner edge of the wall surface 4c'. The curved wall surface 4b' has a predetermined radius of curvature that directs the fuel hitting the upper wall of the piston 4' upwardly towards the vicinity of the tip of the fuel injection valve 11'. The flat wall surface 4c' joins the curved wall surface 4b' and points substantially toward the direction from which the fuel is injected, e.g., the vicinity of the tip of the fuel injection valve 11'.

Figure 10:
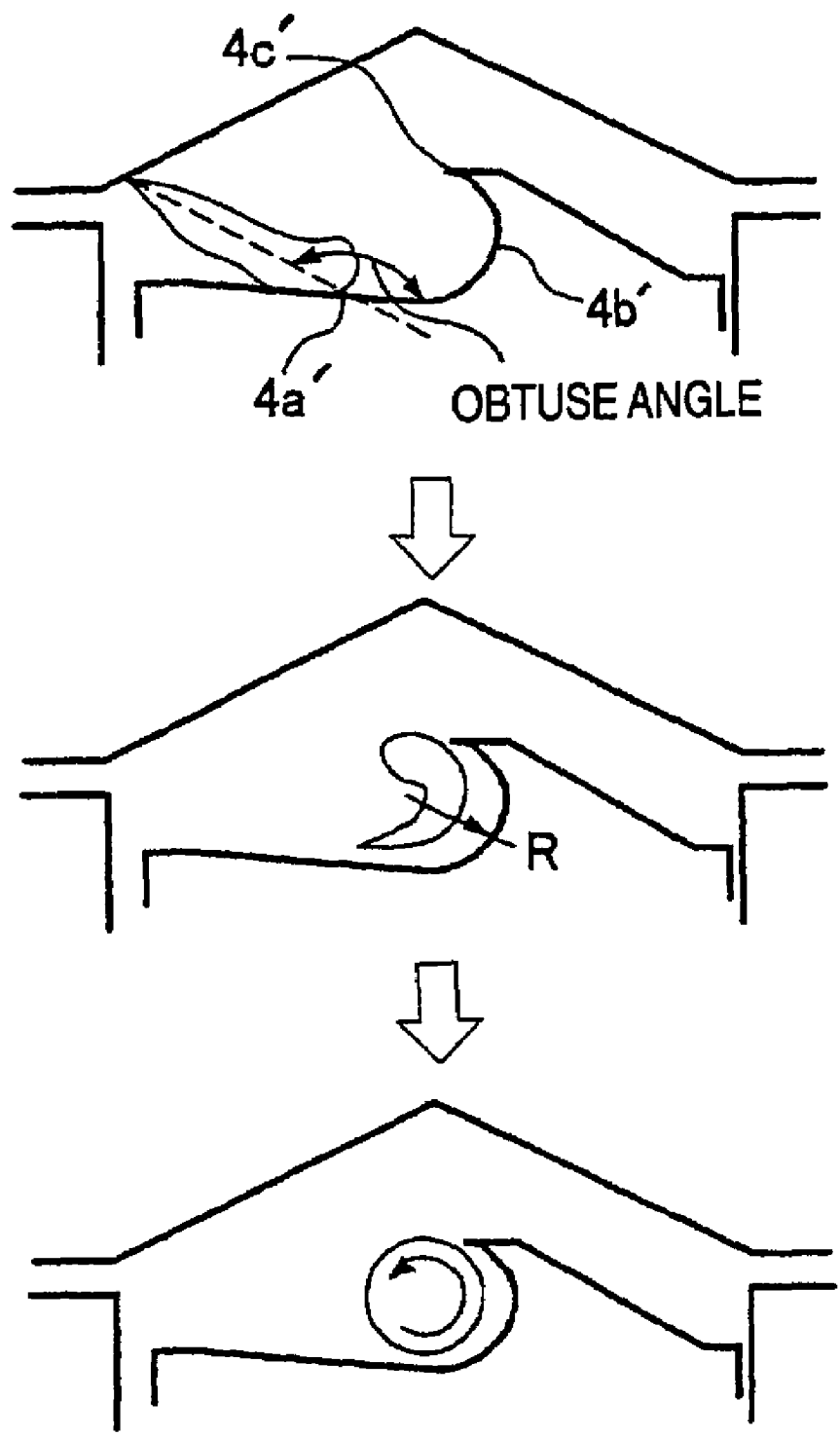
FIG. 10 is a sequential schematic illustration of fuel being injected into the cavity of the top surface of the piston to show the behavior of the injected fuel stream in the direct fuel injection engine illustrated in FIG. 9 in accordance with the second embodiment of the present invention.

Referring now to FIG. 10, the relationship between the shape of the cavity C' and the behavior of the fuel streams that are injected from the fuel injection valve 11' into the combustion chamber 1 is illustrated at a first fuel injection timing in which the fuel streams strike the bottom wall surface 4a' of the cavity C'. Similarly to the first embodiment, the injected fuel is imparted with a flow velocity that rotates in a swirling manner. The rotating flow velocity pulls in air from the surroundings and the fuel-air mixture formed above the cavity C' is homogeneous and free of concentration variations.

Figure 11:
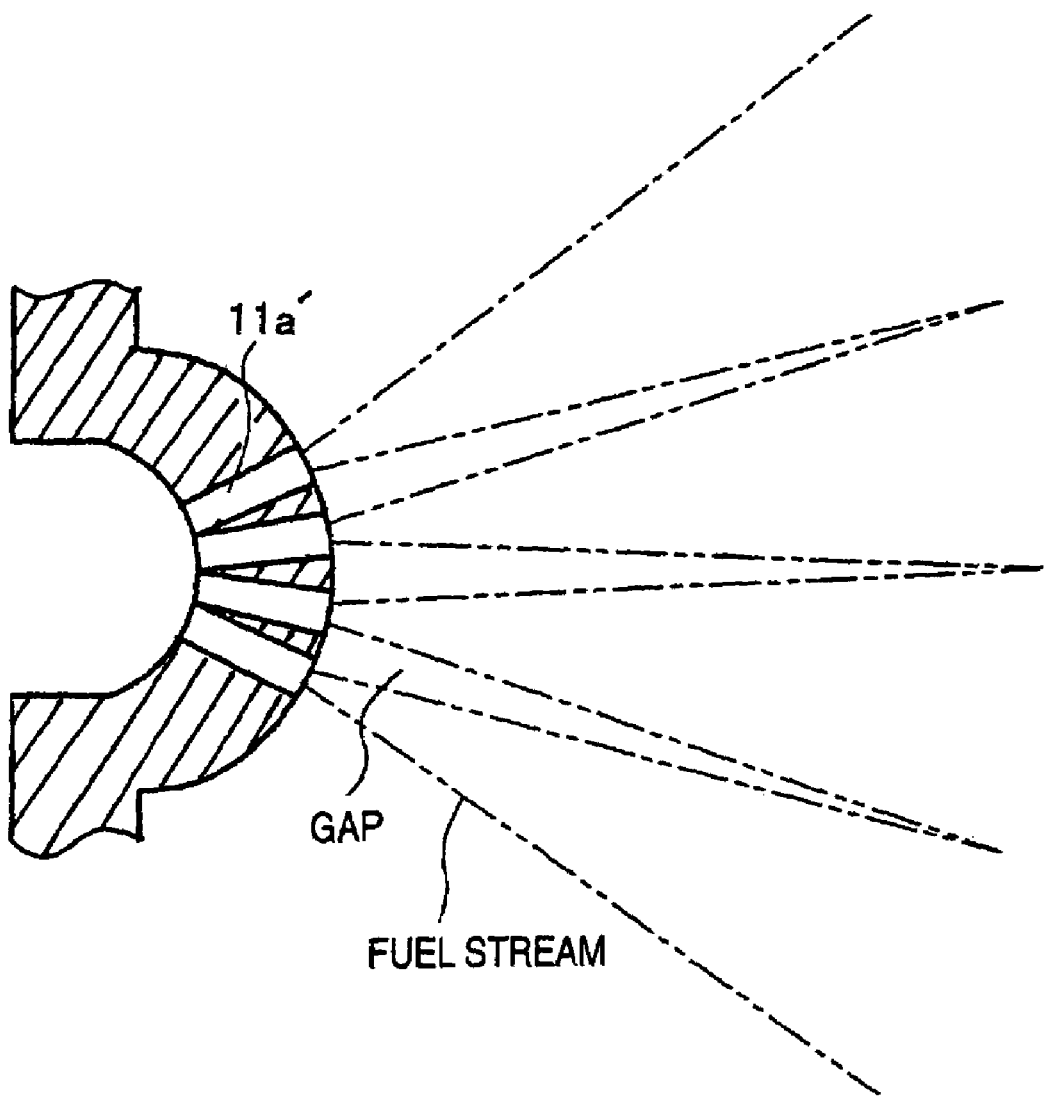
FIG. 11 is a diagrammatic horizontal cross sectional view of the tip section of the fuel injection valve of the direct fuel injection engine illustrated in FIG. 9 in accordance with the second embodiment of the present invention.

FIG. 11 shows a horizontal cross section of the tip part of the fuel injection valve 11' with the fuel streams being sprayed from the fuel injection valve 11', when viewed from above the combustion chamber 1. The fuel injection valve 11' is a hole nozzle provided with a plurality of injection vents 11a' arranged in a radial pattern with an equal angular spacing in a plan view. Each injection vent 11a' has a circular cross section with a prescribed diameter.

Figure 12:
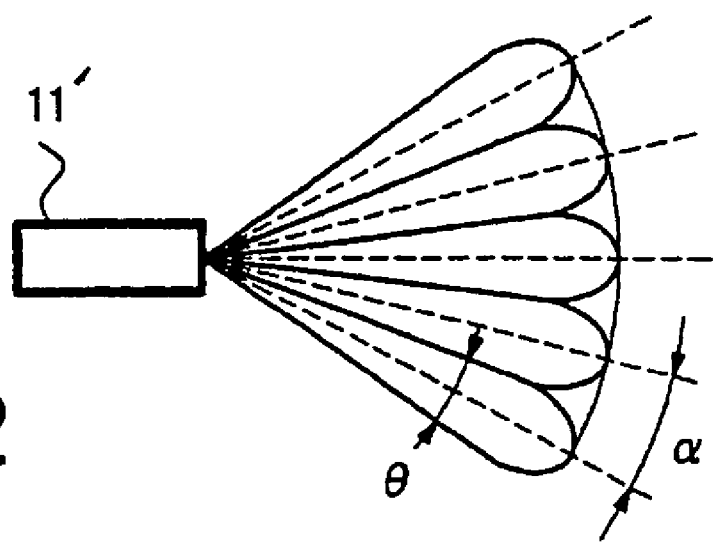
FIG. 12 is a top diagrammatic illustration of the shape of the fuel streams from the fuel injection valve of the direct fuel injection engine illustrated in FIG. 9 in accordance with the second embodiment of the present invention.
Figure 13:
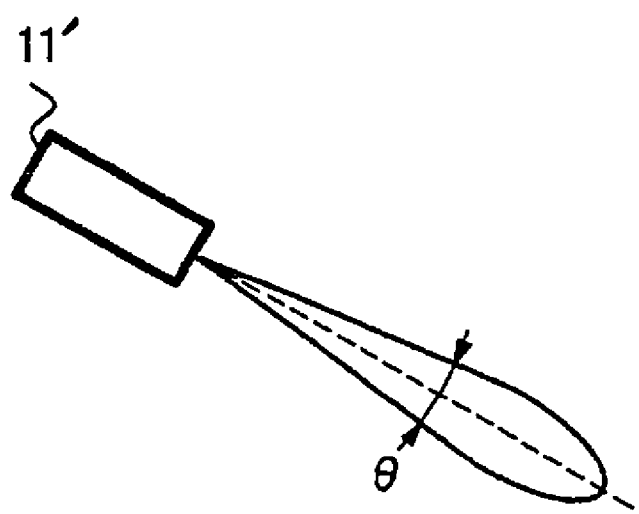
FIG. 13 is a side diagrammatic illustration of the shape of the fuel streams from the fuel injection valve of the direct fuel injection engine illustrated in FIG. 9 in accordance with the second embodiment of the present invention.

FIGS. 12 and 13 show top and side views of the fuel streams from the fuel injection valve 11' in accordance with the second embodiment of the present invention. Similar to the first embodiment, the fuel injection valve 11' is a hole nozzle and can form a fuel stream having a stable shape and strong directionality, even under the high back pressure conditions that exist during the latter half of the compression stroke. The fuel injection valve 11' is provided with a plurality of injection vents arranged with an equal angular spacing when viewed from above. As a result, a combined fuel stream is formed which has the shape of a fan.

The injection vents 11a' of the fuel injection valve 11' each form a fuel stream having a solid circular cone shape that is close to being rod-shaped. Thus, the injection vents 11a' are arranged and configured to directly inject fuel into the combustion chamber 1 against the fuel stream directing surface as plurality of elongated solid-core fuel streams that strike at non-perpendicular angles.

The separation angle $\alpha$ (in FIG. 12) formed between adjacent center axes of the injection vents 11a' is less than or equal to the spread or spraying angle $\theta$ (in FIG. 13) of the fuel streams sprayed from a single one of the injection vent 11a'. In other words, the adjacent pairs of the injection vents 11a' are arranged such that the center spraying axes form predetermined separation angles $\alpha$ between adjacent pairs of the solid-core fuel streams that are equal to or smaller than the spraying angles $\theta$ of the injection vents 11a. As a result, adjacent individual fuel streams overlap each other, except for the area immediately adjacent the injection vent 11a' as seen in FIG. 11.

Figure 14:
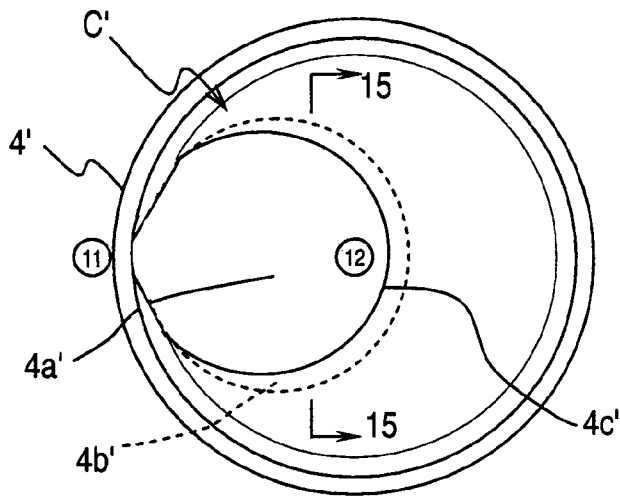
FIG. 14 is a top diagrammatic plan view of the shape of the circularly cavity formed in the top surface of the piston of the direct fuel injection engine illustrated in FIG. 9 of the second embodiment, when viewed from above the piston.
Figure 15:
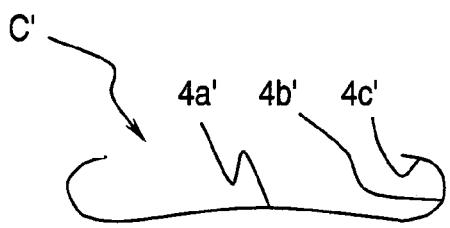
FIG. 15 is a diagrammatic transverse cross sectional view of the circularly cavity as seen along section line 15—15 of FIG. 14 that is formed in the top surface of the piston of the direct fuel injection engine illustrated in FIG. 9 of the second embodiment.
Figure 16:
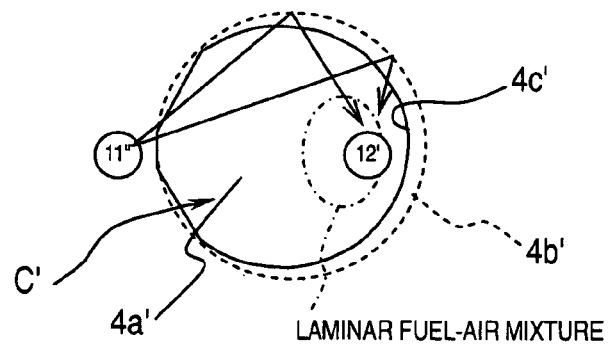
FIG. 16 is a schematic illustration showing the fuel streams from the fuel injection valve relative to the spark plug and the fuel injection valve for the circularly shaped cavity formed in the top surface of the piston of the direct fuel injection engine illustrated in FIG. 9 of the second embodiment, when viewed from above the piston.

FIGS. 14–16 show the shape of the piston cavity C' when viewed from above the combustion chamber 1. The cavity C' has the shape that incorporates a portion of a circle. As a result, the fuel streams, which spread out into a fan shape in a top view, gathers around the spark plug 12.

THIRD EMBODIMENT

Figure 17:
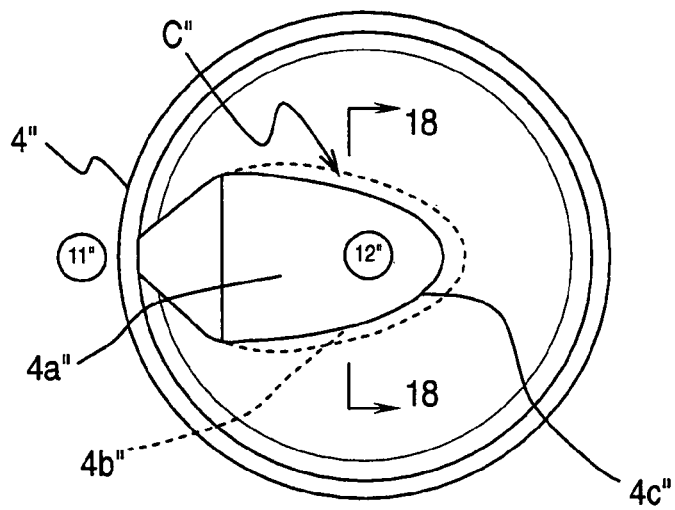
FIG. 17 is a diagrammatic top plan view of an alternate shape (elliptical) for the cavity formed in the top surface of the piston of the direct fuel injection engine illustrated in FIG. 9 of the second embodiment, when viewed from above the piston.
Figure 18:
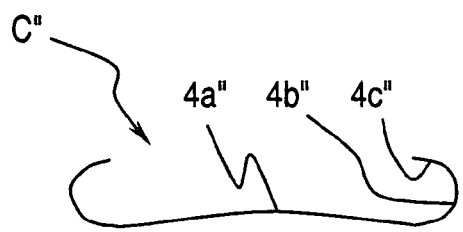
FIG. 18 is a diagrammatic transverse cross sectional view of the elliptically cavity as seen along section line 18—18 of FIG. 17 that can be formed in the top surface of the piston of the direct fuel injection engine illustrated in FIG. 9 of the second embodiment.
Figure 19:
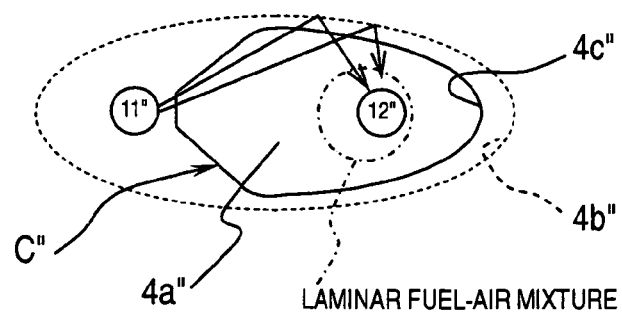
FIG. 19 is a sequential schematic illustration showing the fuel streams from the fuel injection valve relative to the spark plug and the fuel injection valve for the elliptically shaped cavity of FIGS. 17 and 18 that can be formed in the top surface of the piston of the direct fuel injection engine illustrated in FIG. 9 of the second embodiment, when viewed from above the piston.

Referring now to FIGS. 17–19, a schematic view of a direct fuel injection engine invention will be described in accordance with a third embodiment of the present invention. This third embodiment is identical in construction and function as the second embodiment, except that a partial elliptically shaped piston C'' is formed in the piston in this third embodiment, instead of the circularly shaped cavity C' of the second embodiment. Thus, the partial elliptically shaped piston C'' basically functions in the same manner as the circularly shaped cavity C'. Moreover, the general descriptions of the function of the circularly shaped cavity C' also apply to the partial elliptically shaped piston C'''. Thus, the shape of the cavity C" causes the fuel streams injected from the fuel injection valve 11' to form a fuel circulating region, as shown in FIG. 10. The fuel circulating region formed by the fuel streams injected from the fuel injection valve 11" against the partial elliptically shaped piston C" results in a uniform laminar fuel-air mixture in the same manner as the circularly shaped cavity C'. Since the spark plug 12" is located at a focus of the ellipse, the injected fuel streams gather in the vicinity of the spark plug 12" due to the shape of the cavity C" and the laminar fuel-air mixture is centered on the spark plug 12".

In view of the similarity between the second and third embodiments, third embodiment will not be discussed in detail herein. Thus, the descriptions of the parts of the second embodiment that are identical to the parts of the first embodiment may be omitted for the sake of brevity.

In this embodiment, similar to the second embodiment shown in FIG. 9, the present invention is applied to an engine in which the fuel injection valve 11" is positioned to the side of the combustion chamber and below the intake port. In particular, the portion of the top or upper wall of the piston 4" on the intake side of the engine is provided with the partial elliptically shaped cavity C". The partial elliptically shaped cavity C" has a bottom wall surface 4a" (first wall surface), a curved wall surface 4b" (second wall surface) and a flat surface 4c" (third wall surface). The bottom wall surface 4a" is offset from the center of the piston 4" and slants slightly downward as it moves inwardly towards the center of the piston 4".

The curved wall surface 4b" joins the inner edge of the bottom wall surface 4a" to the inner edge of the wall surface 4c". The curved wall surface 4b" has a predetermined radius of curvature that directs the fuel hitting the upper wall of the piston 4" upwardly towards the vicinity of the tip of the fuel injection valve 11". The flat wall surface 4c" joins the curved wall surface 4b" and points substantially toward the direction from which the fuel is injected, e.g., the vicinity of the tip of the fuel injection valve 11".

As seen in FIGS. 17–19, when viewed from above, this partial elliptically shaped cavity C" has a shape that incorporates a portion of an ellipse whose foci are located at the fuel injection valve 11" and at the spark plug 12". The shape of the partial elliptically shaped cavity C" causes the injected fuel streams to gather in the vicinity of the spark plug 12" and form a laminar fuel-air mixture that is centered on the spark plug 12". Compared to the circularly shaped cavity C' shown in FIGS. 14–16, this partial elliptically shaped cavity C" provides a more concentrated laminar fuel-air mixture and achieves a stable laminar combustion with good fuel efficiency, particularly under low load conditions.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection engine comprising:
    a combustion chamber having a piston movably mounted therein, the piston including an upper wall having a cavity with a fuel stream directing surface;
    a spark plug having a spark discharge gap arranged to ignite a fuel-air mixture in the combustion chamber; and
    a fuel injection valve including a front edge portion with a plurality of injection vents arranged in a vicinity of a center axis of the piston and configured to directly inject fuel into the combustion chamber against the fuel stream directing surface as a plurality of solid-core fuel streams that strike at non-perpendicular angles with the solid-core fuel streams having center spraying axes arranged to form a hollow circular cone shape,
    the fuel stream directing surface including first and second wall surfaces with the second wall surface curving from the first wall surface toward the fuel injection valve to direct movement of the fuel streams after hitting the first wall surface toward the fuel injection valve,
    the first wall surface including a surface area where the fuel streams flow after hitting the first wall surface that forms an obtuse angle with the center spraying axes.

2. The direct fuel injection engine as recited in claim 1, wherein the cavity further includes a third wall surface extending from the second wall surface, and being oriented toward a vicinity of the front edge of the fuel injection valve.

3. The direct fuel injection engine as recited in claim 2, wherein
    the second wall surface has an end edge portion with a tangent oriented toward a vicinity of the front edge of the fuel injection valve.

4. The direct fuel injection engine as recited in claim 3, wherein
    the fuel injection valve is further configured to provide a fuel injection pressure of at least 20 MPa.

5. The direct fuel injection engine as recited in claim 4, wherein
    the second wall surface is elliptically shaped in a top plan view with its focal points being located at the front edge portion of the fuel injection valve and at the spark discharge gap of the spark plug.

6. The direct fuel injection engine as recited in claim 1, wherein
    the second wall surface has an end edge portion with a tangent oriented toward a vicinity of the front edge of the fuel injection valve.

7. The direct fuel injection engine as recited in claim 1, wherein
    the fuel injection valve is further configured to provide a fuel injection pressure of at least 20 MPa.

8. The direct fuel injection engine as recited in claim 1, wherein
the second wall surface is elliptically shaped in a top plan view with its focal points being located at the front edge portion of the fuel injection valve and at the spark discharge gap of the spark plug.

9. A direct fuel injection engine comprising:
means for forming a combustion chamber having a piston movably mounted therein, the piston including an upper wall having a cavity with a fuel stream directing surface having a first wall surface and a second wall surface extending upwardly from the first wall surface;
means for igniting a fuel-air mixture in the combustion chamber; and
means for directly injecting fuel into the combustion chamber against the first wall as a plurality of solid-core fuel streams with center spraying axes arranged to form a hollow circular cone shape,
the second wall surface curving from the first wall surface toward the fuel injection valve to direct movement of the fuel streams after hitting the first wall surface toward the fuel injection valve, the first wall surface including a surface area where the fuel streams flow after hitting the first wall surface that forms an obtuse angle with the center spraying axes of the injection vents.

* * * * *